United States Patent [19]

Harker et al.

[11] Patent Number: 5,593,096
[45] Date of Patent: Jan. 14, 1997

[54] METHOD AND APPARATUS FOR SEPARATING ADHERED PAPER FROM PAPER COVERED GYPSUM BOARD

[76] Inventors: Byron W. Harker, 8557 - 213th Street; John A. McCamley, 20321 - 80th Avenue, both of Langley, British Columbia, Canada

[21] Appl. No.: 328,332

[22] Filed: Oct. 24, 1994

Related U.S. Application Data

[63] Continuation of Ser. No. 51,579, Apr. 23, 1993, abandoned, which is a continuation of Ser. No. 561,370, Jul. 31, 1990, abandoned, which is a continuation of Ser. No. 321,229, Mar. 8, 1989, abandoned.

[51] Int. Cl.$^6$ .............................. B20C 19/00; B20C 19/12
[52] U.S. Cl. .......................... 241/14; 241/24.12; 241/27; 241/73; 241/79; 241/88.4; 241/189.1
[58] Field of Search .................................. 241/3, 14, 24, 241/27, 73, 79, 88.4, 189.1, 240, 75, 24.12

[56] References Cited

U.S. PATENT DOCUMENTS

| | | | |
|---|---|---|---|
| 3,337,139 | 8/1967 | Lloyd et al. | 241/79 X |
| 3,790,091 | 2/1974 | Law et al. | 241/DIG. 38 X |
| 4,522,344 | 6/1985 | Morey | 241/79 |
| 4,801,101 | 1/1989 | Dreyer et al. | 241/240 |
| 4,807,817 | 2/1989 | Schoewe | 241/DIG. 38 X |
| 5,064,126 | 11/1991 | Hickey et al. | 241/73 |
| 5,238,195 | 8/1993 | Knez, Jr. | 241/24 |

FOREIGN PATENT DOCUMENTS

| | | | |
|---|---|---|---|
| 0073864 | 3/1983 | European Pat. Off. | 241/24 |

*Primary Examiner*—John M. Husar
*Attorney, Agent, or Firm*—Klarquist Sparkman Campbell Leigh & Whinston

[57] ABSTRACT

Adhered paper is separated from paper covered gypsum board by hammermilling the gypsum board through holes of a hammermill grate, the hole size being selected to produce a screenable mixture of pieces of paper and separated gypsum board particles. The mixture may then be screened to segregate the pieces of paper from the particles.

13 Claims, 1 Drawing Sheet

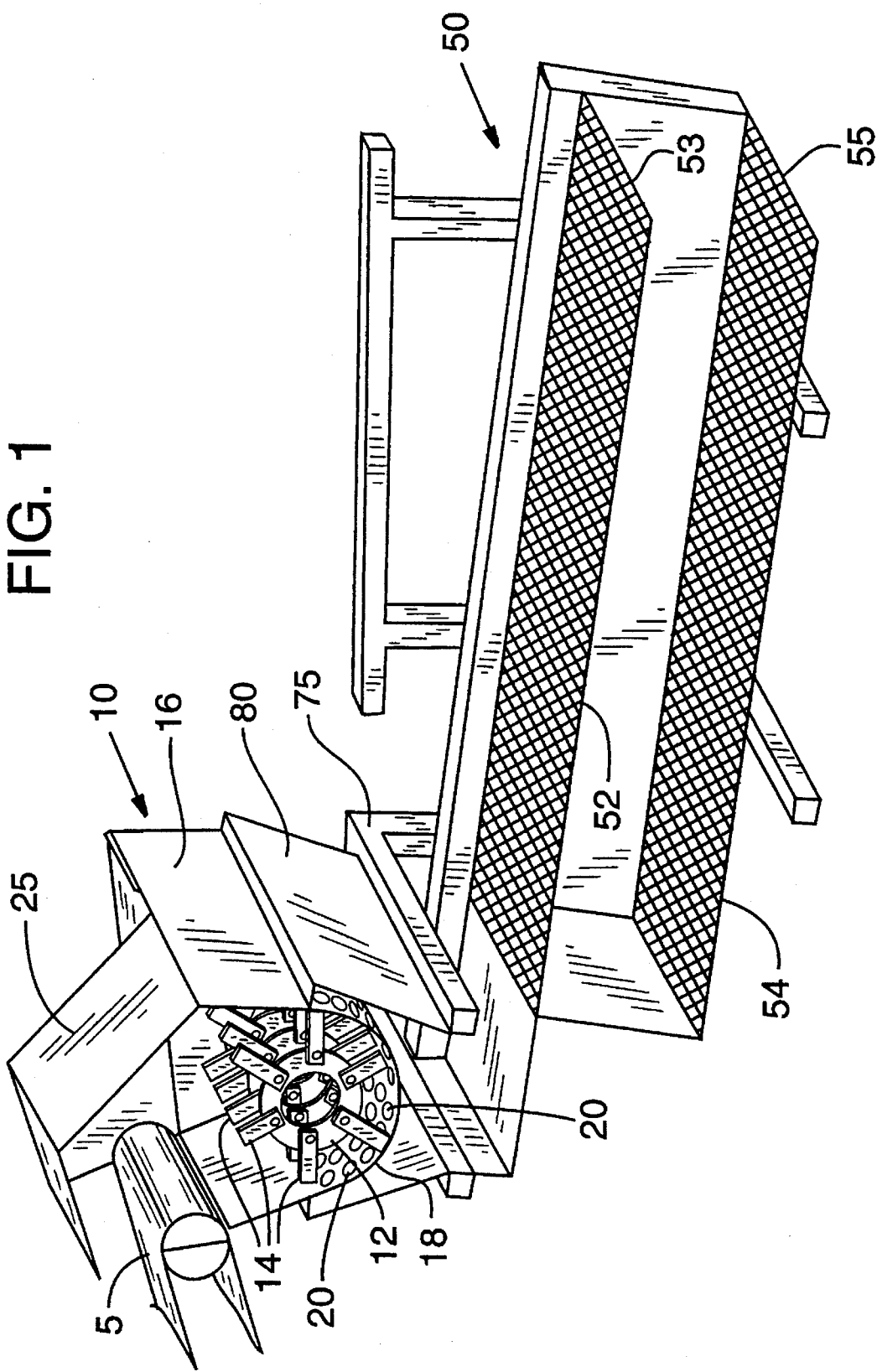

METHOD AND APPARATUS FOR SEPARATING ADHERED PAPER FROM PAPER COVERED GYPSUM BOARD

This application is a continuation of application Ser. No. 08/051,579, filed on Apr. 23, 1993 now abandoned, which is a continuation of application Ser. No. 07/561,370, filed on Jul. 31, 1990 now abandoned, which is a continuation of Ser. No. 321,229, filed Mar. 08, 1989, now abandoned.

FIELD OF INVENTION

This invention relates to the separation of adhered paper from paper covered gypsum board, and has application in the recovery and recycling of gypsum and paper from paper covered gypsum board.

BACKGROUND OF THE INVENTION

In the residential and commercial construction industries, gypsum board with paper adhered to the surfaces thereof (often referred to a gypsum wallboard, or simply wallboard) is an extensively used building material. Generally, it is supplied in the form of large rectangular sheets which the builder cuts to size depending upon the particular project.

Although efforts may be made to minimize the wastage of material, a single construction site will often generate a substantial amount of leftover gypsum wallboard pieces which are essentially useless and which require disposal. A need for disposal also arises when homes or buildings containing gypsum wallboard are demolished.

Historically, the disposal of wallboard material has posed a problem. At the very least it is an uneconomic nuisance and, in some jurisdictions, it is considered to be an unacceptable environmental hazard. The material is not readily degradable and disposal may be prohibited at conventional dumps or waste fill sites. In some cases, the material is transported by barge and disposed of at sea.

The disposal problem arises because waste wallboard has no significant practical purpose so long as the paper and gypsum board remain adhered together. Further, when exposed to the weather and outside environmental conditions, the combination can deteriorate to a polluting sludge of paper and gypsum. On the other hand, if the paper and the gypsum board are separated, the sludge problem can be avoided. Furthermore, if the separation is sufficiently complete, then the paper and/or the gypsum can be recycled.

Accordingly, efforts have been made to achieve a separation of the adhered paper from scrap wallboard. One such method has involved the pulverization of the wallboard, but the resulting product has been an inefficient and difficult to manage mixture of gypsum board particles and paper fluff. As well, it is understood that chemical processes have been tried, but with results considered unsatisfactory either by reason of insufficient separation or excessive cost.

A primary object of the present invention is to provide a new and improved method and apparatus for separating adhered paper from paper covered gypsum board.

A further object of the present invention is to provide a new and improved method and apparatus for separating and segregating a substantial amount of adhered paper from paper covered gypsum board.

SUMMARY OF THE INVENTION

In accordance with a broad aspect of the method of the present invention there is provided a method of separating adhered paper from paper covered gypsum board, the method comprising the step of hammermilling the gypsum board through holes of a hammermill grate, the size of the holes being selected to produce a screenable mixture of pieces of paper and separated gypsum board particles.

The foregoing process step has been found to achieve a highly effective sparation. At this stage, there is no segregation of the resulting pieces of paper and gypsum board particles, but there is an easily manageable mix of these constituents. In a preferred embodiment where the selected size of the grate holes is about 2", the resulting pieces of paper tend to be sized 1" or greater and the resulting gypsum board particles tend to be sized ¾" or less.

An interesting feature, and one which is key to the practical effectiveness of the present invention, is that the resulting pieces of paper are relatively clean. There will be a film or dusting of fine gypsum board particles, but otherwise only a small amount of larger particles will remain adhered. The mix may then be screened to achieve a substantial segregation of the paper from separated gypsum board particles.

The present invention is considered advantageous over the prior art process that pulverizes wallboard and produces paper fluff, not only because the discrete pieces of paper that are produced are easier to manage than fluff, but also because the present invention will work with gypsum wallboard that is relatively damp in condition. In this regard, it is understood that the pulverizing process requires relatively dry wallboard—a limitation which is undesirable because scrap wallboard may often be exposed to damp or wet conditions for some period of time before processing.

The foregoing and other features of the present invention will now be described with reference to the drawing.

BRIEF DESCRIPTION OF THE DRAWING

FIG. 1 is a perspective elevation view, partially cut-away, of apparatus embodying the present invention, and which implements the process of the present invention.

DETAILED DESCRIPTION

In FIG. 1, there is shown a hammermill generally designated 10, a screening means generally designated 50, and a hopper designated 80 which receives the output of the hammermill and guides such output to the screening means. As well, FIG. 1 shows a conveyor 5 for transporting paper covered gypsum board scrap or wallboard (not shown) to the hammermill.

Hammermill 10 is basically a conventional design comprising a rotor 12 to which is attached a plurality of impact arms or hammers 14. A casing 16 having an open top and solid opposite upper wall portions provides a housing for the rotor and hammer assembly. A hood 25 is provided to assist the direction of wallboard received from conveyor 5 into the hammermill. The lower semi-cylindrical portion 18 of casing 16, is substantially uniformly spaced from the hammers 14 and which includes a plurality of circular holes 20, serves as a grate through which fractured and broken pieces of wallboard are driven by hammers 14. As can be seen, hammermill 10 and hopper 80 are elevated on a supporting base 75 to enable the output of the hammermill to be gravity fed to screening means 50.

As indicated above, hammermill 10 is basically a conventional design. Indeed, a particular hammermill that has been used with exemplary results is that from an H1100 Tub Grinder manufactured by Haybuster Manufacturing Inc. of Jamestown, N. Dak. This hammermill, normally intended for the purpose of breaking up bales of hay, includes the casing structure described above, the holes in the lower grate portion being about 2" in diameter. Within the working environment of the present invention, the hammermill works well with its rotor driven at about 1750 rpm with a 60 HP motor (not shown in Figure).

In operation, scrap wallboard is transported to hammermill 10 by conveyor 5. As indicated above, it is then fractured, broken and driven through grate holes 20. The resulting output is a mix of pieces of papers and gypsum board particles with only a relatively small amount of the particles remaining adhered to the paper—mostly as a film or dusting on the paper. With 2" grate holes, the pieces of papers are generally sized 1" or greater, and the gypsum board particles are generally sized ¾" or less.

With 2" grate holes, the foregoing result has been achieved consistently, but without knowledge of what glue or other mechanism has been used by the wallboard manufacturer to adhere paper to the gypsum board and without detailed knowledge of the composition of the gypsum board itself. Accordingly, although the situation has not been encountered in practice, it is possible that such separation will not be achieved for all types of wallboard, or that it may only be achieved with a different size of grate holes.

Screening means 50 depicted in FIG. 1 comprises a two deck screen having an upper wire mesh screen 52 and a lower wire mesh screen 54, both being tilted at an angle of about 7° to facilitate the longitudinal flow of material over the screens. In a preferred embodiment, the mesh size of upper screen 52 is about 1" and the mesh size of lower screen 54 is about ¾".

Screening means 50 represented in the Figure, is a commercially available two deck high speed flat rotary screen assembly manufactured by Burnaby Machine & Mill Equipment Ltd. of Burnaby, British Columbia. Initially designed for the purpose of screening wood chips, it is also suited to the present invention because the action of the screens is to tumble material while being screened. A tumbling action is desirable to achieve a more complete segregation of pieces of paper and gypsum particles. Otherwise, there can be a tendency for particles to ride across a screen carried by the pieces of paper.

In operation, a mix of pieces of paper and gypsum board particles is fed from hopper 80 and begins to flow and tumble along upper screen 52 (left to right in the Figure). As the flow proceeds, a substantial amount of the gypsum board particles falls through screen 52, leaving most of the paper pieces to be transported the full length of screen 52 and to carry off end 53. A substantial segregation is achieved at this stage. However, while most of the paper pieces are sufficiently large not to pass through screen 52, at least some pieces may be sufficiently small to filter through. Lower screen 54 having a smaller mesh size (still large enough to allow passage of most gypsum particles), is designed to catch a significant amount of these smaller pieces of paper. Pieces of paper that are caught along the length of lower screen 54 are transported and carried off end 55 to the same area as pieces leaving end 53 of upper screen 52.

The invention is not to be considered as limited to the particular embodiment that has been described. For example, while the use of a two deck or two stage screening process is considered efficient and desirable for that reason, a single stage could be used. The degree of segregation might not be as good as that which can be achieved with a single stage, or the volume rate of flow to achieve the same degree of segregation might be less, but significant segregation can be achieved nevertheless. Various modifications and changes are possible within the spirit and scope of the following claims.

We claim:

1. A method of separating adhered paper from paper covered gypsum board, including relatively damp gypsum board, comprising:

hammermilling said gypsum board by fracturing impact down through holes of a hammermill grate, said holes having a circular cross-section to size and separate a substantial amount of said adhered paper from said gypsum board to a screenable mixture of pieces of paper and smaller separated gypsum board particles, said pieces of paper having a maximum transverse dimension less than the minimum transverse dimension of said holes;

feeding said mixture from the grate; and screening said mixture to segregate a substantial amount of said pieces of paper from said gypsum board particles.

2. A method as defined in claim 1, wherein said hammermilling step comprises impacting the fractured gypsum through circular grate holes having a diameter of about 2 inches.

3. A method as defined in claim 2, wherein said screening is performed through a mesh screen having a mesh size of about 1 inch.

4. The method of claim 1, further comprising the step of driving the hammermill at about 1,750 rpm.

5. Apparatus for separating and segregating adhered paper from paper covered gypsum board, said apparatus comprising:

(a) a hammermill, comprising:
    (i) a gypsum board receiving inlet;
    (ii) a curved casing having opposing upper portions that are solid and a lower central grate portion with a plurality of holes defined therein, the lower central grate portion being substantially uniformly spaced from the rotating hammers; and
    (iii) rotating hammers positioned to fracture the received gypsum board by fracturing impact and deliver the fractured gypsum board through said holes, said holes having a circular cross-section to size and separate a substantial amount of said adhered paper from said gypsum board to produce a screenable mixture of pieces of paper and smaller separated gypsum board particles, said pieces of paper having a maximum transverse dimension less than the minimum transverse dimension of said holes;

(b) a screen positioned to segregate a substantial amount of said pieces of paper from said gypsum board particles; and (c) a guide through which the hammered mixture from said hammerhill is delivered to the screen.

6. Apparatus as defined in claim 5, wherein said holes are circular, each having a diameter of about 2 inches.

7. Apparatus as defined in claim 6, wherein said screening means comprises a mesh screen for receiving said mixture feed from said hammermill, the mesh screen having a mesh size of about 1 inch.

8. An apparatus for separating and segregating adhered paper from paper covered gypsum board comprising:

a hammermill having an inlet through which gypsum board is delivered to the hammermill, a plurality of rotating hammers which hammer the delivered gypsum board, and a grate having holes of a circular cross section through which the fractured gypsum board is hammered by the operation of the rotating hammers, whereby only a relatively small amount of paper remains adhered to the gypsum board and the gypsum board is sized to produce a screenable mixture of pieces of paper and smaller separated gypsum board particles; and a screen positioned to receive the screenable mixture from the hammermill, the screen including first and second screen sections, the first screen section having a first mesh size which is less than the diameter of the circular holes; the second screen section having a second mesh size which is less than the first mesh size, the first and second screen sections being positioned such that the screenable mixture is first passed to the first screen section for screening thereby and then passed to the second screen section for further screening.

9. An apparatus according to claim 8 in which the first and second screen sections are stacked with the first screen section positioned above the second screen section such that material passing through the first screen section is delivered to the second screen section, the screen sections comprising vibrating screens and being tilted relative to horizontal such that material which does not pass through a screen section travels along the screen section to a collection location.

10. An apparatus according to claim 9 in which the circular holes are about two inches in diameter, the first screen section is a one inch mesh screen, and the second screen section is a three-quarter inch mesh screen.

11. An apparatus according to claim 8 in which the circular holes are about two inches in diameter, the first screen section is a one inch mesh screen, and the second screen section is a three-quarter inch mesh screen.

12. An apparatus according to claim 8, wherein the central lower grate portion is uniformly spaced from the rotating hammers of the hammermill.

13. An apparatus for separating and segregating adhered paper from paper covered gypsum board comprising:

a hammermill having an inlet through which gypsum board is delivered to the hammermill, the hammermill having a plurality of rotating hammers;

a grate having circular holes defined therein, the circular holes having about a two inch diameter, the grate being uniformly spaced from the rotating hammers such that the paper covered gypsum board is hammered through the circular holes by the operation of the rotating hammers, whereby only a relatively small amount of paper remains adhered to the gypsum board and the gypsum board is sized to produce a screenable mixture of pieces of paper and smaller separated gypsum board particles; and a screen positioned to receive and segregate the screenable mixture from the hammermill.

* * * * *